United States Patent [19]

Son et al.

[11] Patent Number: 4,472,548

[45] Date of Patent: Sep. 18, 1984

[54] OLIGOMERIC PHENYLPHOSPHONITES

[75] Inventors: Pyong-Nae Son, Akron; George Kletecka, Rocky River, both of Ohio

[73] Assignee: The B. F. Goodrich Company, Akron, Ohio

[21] Appl. No.: 509,567

[22] Filed: Jun. 30, 1983

[51] Int. Cl.$^3$ .............................................. C08K 5/53
[52] U.S. Cl. .................................... 524/102; 524/126
[58] Field of Search ............... 260/930; 524/126, 102; 528/169

[56] References Cited

U.S. PATENT DOCUMENTS

| | | | |
|---|---|---|---|
| 3,138,570 | 6/1964 | Fowler et al. | 524/126 |
| 3,737,486 | 6/1973 | Schutze et al. | 260/930 |
| 4,075,163 | 2/1978 | Hofer et al. | 524/126 |
| 4,107,138 | 8/1978 | Hofer et al. | 524/126 |
| 4,211,731 | 7/1980 | Hofer et al. | 524/126 |
| 4,246,170 | 1/1981 | Evans | 524/126 |

*Primary Examiner*—John Kight
*Assistant Examiner*—Kriellion Morgan
*Attorney, Agent, or Firm*—J. Hughes Powell, Jr.; Alan A. Csontos

[57] ABSTRACT

Oligomeric alkylenebisphenyl phenylphosphonites, easily prepared by the reaction of phenyldichlorophosphine and certain bis-phenols in the presence of a base, provide enhanced stabilizing activity to hydroxyalkyleneyl isocyanurates when combined to stabilize organic materials subject to degradation. These oligomeric phenylphosphonites are not expensive, resist hydrolysis, do not evaporate from or are leached out of polymers when mixed therewith and provide excellent protection to polymers during processing and result in decreased water carry over of polymer films on leaving a cooling water bath during the film forming process.

12 Claims, No Drawings

OLIGOMERIC PHENYLPHOSPHONITES

BACKGROUND OF THE INVENTION

U.S. Pat. No. 3,531,483 discloses hydroxyalkyleneyl isocyanurate compounds that are useful stabilizers for organic materials that are subject to degradation. A variety of organic phosphorous containing compounds have been proposed and tried in combination with the hydroxyalkyleneyl isocyanurates to enhance the stabilizing action of the isocyanurates, with varying degrees of success. Some of these phosphorous compounds are difficult to make, are expensive, some are subject to hydrolysis, evaporate or are leached from polymers during processing, are less effective than desired during the processing of polymers cause excessive water carry over in film forming processes, and the like. Effective stabilizers to enhance the stabilizing activity of hydroxyalkyleneyl isocyanurates that are more readily and inexpensively made, that are resistant to hydrolysis, evaporation and leaching during processing of polymers, that provide protection during processing and that have decreased water carry-over in film processsess are desired.

SUMMARY OF THE INVENTION

Oligomeric alkylenebisphenyl phenylphosphonites, easily prepared by the reaction of phenyldichlorophosphine and certain bis-phenols in the presence of a base, provide enhanced stabilizing activity to hydroxyalkyleneyl isocyanurates when combined to stabilize organic materials subject to degradation. These oligomeric phenylphosphonites are not expensive, resist hydrolysis, do not evaporate from or are not leached polymers when mixed therewith, provide excellent protection to polymers during processing and result in decreased water carry-over of polymer films on leaving a cooling water bath during the film forming process.

DETAILED DESCRIPTION

These oligomeric alkylenebisphenyl phenylphosphonites have the general formula

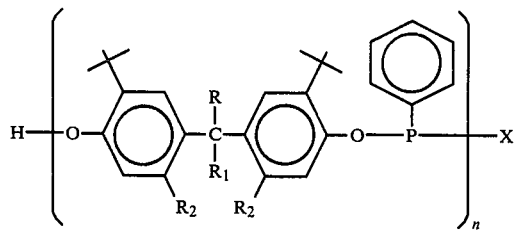

wherein + is a t-butyl radical, R is hydrogen or a methyl radical, $R_1$ is hydrogen or a methyl, ethyl or propyl radical, and

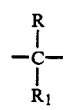

can be represented as —$R_3$— wherein $R_3$ is a methylidene, ethylidene, propylidene, isopropylidene, butylidene, or isobutylidene radical, $R_2$ is hydrogen or a methyl radical, X is chlorine or OH and n is about 2 to 10, as 4 to 8.

These high molecular weight oligomers are prepared by reacting phenyldichlorophosphine with a bis-phenol as defined herein.

Typical bis-phenols include 4,4'-butylidenebis(6-tert-butyl-m-cresol), 4,4'-butylidenebis(2-tert-butylphenol), 4,4'-isopropylidenebis(2-tert-butylphenol), 4,4'-isopropylidenebis(6-tert-butyl-m-cresol), 4,4'-cyclohexylidenebis(6-tert-butyl-m-cresol), 4,4'-cyclohexylidenebis(2-tert-butylphenol), and the like.

The bis-phenols have the general formula

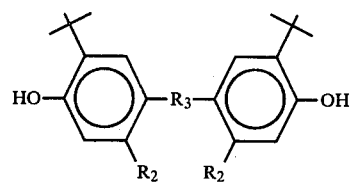

wherein $R_2$ and $R_3$ have the meanings above.

The hydroxyphenylalkyleneyl isocyanurate compounds useful in combination with the oligomeric phenylphosphonites of this invention have the formula

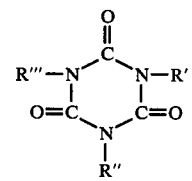

wherein R' is a hydroxyphenylalkyleneyl radical of the formula

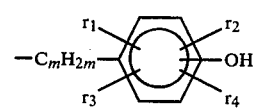

where m is 1 to 4, $r_1$ is an alkyl radical having 1 to 18 carbon atoms and is positioned immediately adjacent to the hydroxy group on the ring; $r_2$, $r_3$, and $r_4$ are hydrogen or an alkyl radical containing 1 to 18 carbon atoms; and R" and R'" are hydrogen, an alkyl radical containing 1 to 18 carbon atoms, or are the same as R'. A more preferred compound is when R" and R'" are equal to R', i.e., all the R groups are hydroxyphenylalkyleneyl radicals, and $r_1$ is a t-alkyl radical containing from 4 to about 12 carbon atoms, $r_2$ is an alkyl radical containing from 1 to about 12 carbon atoms, $r_3$ and $r_4$ are hydrogen, and m is 1.

Even more preferred are the symmetrical tris (3,5-di-tert-alkyl-4-hydroxybenzyl) isocyanurates of the formula

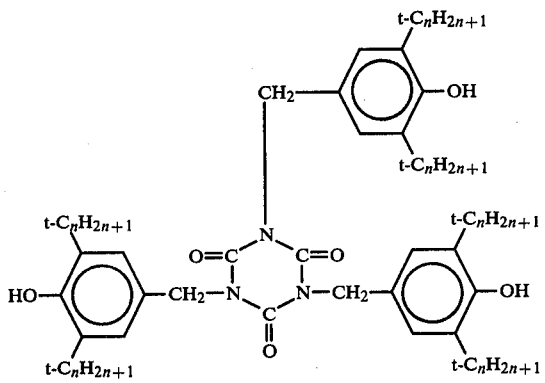

wherein n is 4 to 8.

Examples of the 4-hydroxybenzyl isocyanurate compounds are: tris(3-t-butyl-4-hydroxybenzyl) isocyanurate, tris(3-cetyl-4-hydroxybenzyl) isocyanurate, tris(3,5-dimethyl-4-hydroxybenzyl) isocyanurate, tris(3-methyl-5-isopropyl-4-hydroxybenzyl) isocyanurate, tris-(3,5-di-t-butyl-4-hydroxybenzyl) isocyanurate, tris(3-t-butyl-5-t-amyl-4-hydroxybenzyl) isocyanurate, tris[3,5-di(1-methyl-1-ethylpropyl)-4-hydroxybenzyl] isocyanurate, tris[3,5-di-(1,1,2,2-tetramethylpropyl)-4-hydroxybenzyl] isocyanurate, bis(3,5-dimethyl-4-hydroxybenzyl) isocyanurate, (3-methyl-4-hydroxybenzyl) isocyanurate, (3-t-butyl-4-hydroxybenzyl) isocyanurate and the like. Reference is made to U.S. Pat. No. 3,531,483 which discloses isocyanurate compounds encompassed by this invention. This disclosure of this patent is incorporated herein by reference.

The amount of oligomeric phenylphosphonite used may vary from about 0.01 to 10 weight parts per 100 weight parts of material to be stabilized. More usually about 0.1 to 5.0 parts are used for mixtures with the hydroxyphenylalkyleneyl isocyanurate. The hydroxyphenylalkyleneyl isocyanurate compound is used at a level from about 0.01 part to about 1 to 5 parts by weight, and more preferably at from about 0.05 part to about 3 parts by weight per 100 parts by weight of the organic material. The oligomeric phenylphosphonite is employed at similar levels, i.e., from about 0.01 part to 5 parts and preferably at about 0.05 part to about 3 parts by weight per 100 parts by weight of organic material. Thus the combined weight of the compounds is normally from about 0.02 part to about 10 parts and more preferably from about 0.05 to 5 parts by weight per 100 parts by weight of organic material. The hydroxyphenylalkyleneyl isocyanurate can be used in from about 10:1 to 1:10 weight ratio of isocyanurate compound to the oligomeric phenylphosphonite. Excellent results are obtained at about a 3:1 to 1:3 weight ratio. A 1:1 weight ratio of the compounds provides effective stabilization of organic materials.

These oligomeric phenylphosphonites are readily prepared by reacting a bis-phenol with dichlorophenylphosphine in a solvent in the presence of a base such as a trialkylamine wherein the alkyl grorup contains 1 to 8 carbon atoms.

EXAMPLE 1

21.0 grams (0.055 mole) of 4,4'-butylidenebis (6-tert-butyl-m-cresol), 12.3 grams (0.122 mole) of triethylamine and 300 mls of dry xylene were added to a 500 ml three-neck flask equipped with a stirrer, condensor, thermometer and dropping funnel. While stirring the mixture, 8.3 grams (0.046 mole) of dichlorophenylphosphine was added dropwise to the reaction mixture. The mixture was then heated to reflux for 20 hours, and thereafter cooled to room temperature. The off-white slurry was filtered to remove the triethylammonium chloride by-product. The filtrate was heated to dryness to obtain a sticky, gray reaction product. This was washed with 400 ml of methanol, and 15 grams of white solid product was obtained. This product was purified further with hot ethanol. The dry product had a softening point of 135° C., a number average molecular weight of 2740, determined by vapor pressure osmometry, and a 5.7 percent phosphorous content. This molecular weight represents a value of n of 5.6.

EXAMPLE II

Following the procedure of Example I, 18.7 grams (0.055 mole) of 4,4'-isopropylidenebis(2-tert-butylphenol) was reacted with 8.3 grams (0.046 mole) of dichlorophenylphosphine in 300 ml of dry xylene, and in the presence of 12.3 grams (0.12 mole) of triethylamine. After refluxing overnight, the reaction mixture was cooled. The tan reaction slurry was filtered to remove the triethylammonium chloride. The filtrate was heated to dryness to obtain a gray, sticky solid that hardened overnight. 22.9 grams of product was obtained. This product was ground to a powder state. The reaction product was separated onto two fractions with ethanol. The ethanol-insoluble fraction had a softening point of 108° C. and a number average molecular weight of 2410. The ethanol-soluble fraction, after evaporation of the ethanol, was found to have a softening point of 60° C., and a number average molecular weight of about 760.

The high molecular weight products of both Examples were tested for volatility by Thermogravimetric Analysis. The samples were heated at a rate of 30° C. per minute and the temperature at which 10 percent weight loss occurred was recorded. For Example I, the value was 390° C.; for Example II, 380° C. (320° C. for the lower molecular weight material) and for a commercial phosphorous containing stabilizer, tetrakis(2,4-di-tert-butylphenyl)-4,4'-biphenylenediphosphonite, 285° C.

The oligomeric phenylphosphonites of this invention, prepared as in Examples I and II, were evaluated in polypropylene with a hydroxyalkyleneyl isocyanurate for thermal stability, for processing stability, and water carry over in film forming operations. They were found to provide excellent results in each of these critical tests.

To prepare the samples for evaluation, polypropylene was powder blended with the stabilizers, extruded at 215° C. through a spaghetti die and chopped into cubes or granules. Some of these cubes were extruded at 250° C. through a 3 inch film die, quenched in a water tank and slit into ¼ inch tape strips, run over a heated roll and drawn in an air oven. The tape dimensions, after drawing 6:1, were 2×100 mils. These tapes were used in tests for thermal stability.

Three inch loops of tapes of the polypropylene containing (1) 0.05 of weight parts of tris(3,5-di-t-butyl-4-hydroxybenzyl)isocyanurate per hundred weight parts of polypropylene, (2) 0.05 weight parts of the isocyanurate and 1.0 weight part of the oligomeric phenylphosphonite of Example I and (3) 0.05 weight parts of the isocyanurate and 1.0 weight part of the oligomeric phenylphosphonite of Example II were suspended in a 125°

C. air oven and the time at which 3 inch diameter tape loops broke was determined. This is a measure of the tape's stability to heat. For the control (1) it took about 25±3 days to failure, for (2) about 47±2 days to failure, and for (3) about 43±1 days to failure. This clearly demonstrates the substantial enhancement of resistance to heat and oxidative degradation of polypropylene when an isocyanurate stabilizer is enhanced by the addition of the oligomeric phenylphosphonites of this invention.

The oligomeric phenylphosphonites were evaluated for enhancement of the stability effect of a hydroxyalkyleneyl isocyanurate on the melt flow properties of a polypropylene during multiple extrusions at 270° C. to demonstrate the degree of protection obtained in the polymer during processing when the oligomeric phenylphosphonite of this invention are combined with hydroxyalkyleneyl isocyanurates. The additives and polymer were dry blended at room temperature. A concentrate was first prepared by mixing part of the polymer and additives for three minutes in a blender. The concentrate was then mixed with the remainder of the polymer in a Henschel mixer. The incorporation of the additives was completed by extruding at 215° C. After incorporation and pelletizing or cubing, a sample of each experiment was taken for testing. The remaining polymer was again extruded, this time at 270° C., water cooled, pelletized and sampled. This procedure was repeated for a total of five extruder passes at 270° C.

The melt flow index was determined by following the ASTM D-1238, Condition L procedure. Three specimens for each sample were collected for weighing and determining the melt flow index (MFI). If one of the specimens showed an apparent difference in MFI from the other two, a statistical formula was applied and the questionable result discarded if the confidence factor was less than 95%. The average values of the MFI are recorded in Table I. Plots of melt flow versus extruder passes were made. Linear regression was used to obtain the best fit for the line graphs of the data and the slopes were calculated for these line graphs. The weight parts of isocyanurate and phosphorous containing stabilizers per 100 weight parts of polypropylene are shown in the Table.

TABLE I

| Stabilizer System | Melt Index | | | |
|---|---|---|---|---|
| | First Pass | Second Pass | Third Pass | Fourth Pass |
| (1) 0.05 isocyanurate[a] | 6.98 | 8.11 | 10.44 | 11.70 |
| (2) 0.05 isocyanurate 0.10 Example I | 2.96 | 3.16 | 3.62 | 4.37 |
| (3) 0.05 isocyanurate 0.10 Example II | 2.99 | 3.37 | 3.89 | 4.39 |
| (4) 0.05 isocyanurate 0.10 Weston 618[b] | 4.55 | 5.50 | 6.29 | — |

[a]1,3,5-tris(3,5-di-t-butyl-4-hydroxybenzyl)isocyanurate
[b]distearyl pentaerythritol diphosphite The slopes obtained were for (1) 1.65, (2) 0.42, (3) 0.54, and (4) 0.78. The greater (higher value) the slope, the poorer the processing stability. This, coupled with the melt flow index (the lower the melt flow index, the more stable the composition, and the higher the melt index, the more degradation) make obvious the enhancement of stabilizing activity of the 1,3,5-tris(3,5-di-t-butyl-4-hydroxybenzyl)isocyanurate with the oligomeric phenylphosphonites in protecting polypropylene against potential degradation during processing. These data clearly illustrate the substantial effect of the oligomeric phosphonites in preventing undesirable melt flow change during processing of polypropylene.

The degree of discoloration of polypropylene during processing was determined in accordance with ASTM procedure D-1925 Yellowing Index, on the compositions set forth in Table II.

TABLE II

| Composition | First Pass | Second Pass | Third Pass | Fourth Pass |
|---|---|---|---|---|
| (1) | 6.65 | 8.90 | 10.32 | 11.52 |
| (2) | 0.21 | 2.49 | 3.21 | 4.74 |
| (3) | 0.84 | 2.42 | 3.37 | 4.02 |

The improvement, less discoloration for compounds 2 and 3, containing oligomeric phenylphosphonites of this invention, is evident from the low Index values obtained compared to the much greater discolored control.

The water carry over of extruded film was determined in a 10 inch film forming step during which the rate at which the film could be extruded and cooled and rolled up was directly related to water carry-over on the cooled film. A composition containing 0.05 weight part of 1,3,5-tris(3,5-di-t-butyl-4-hydroxybenzyl)isocyanurate and 0.05 weight part of Weston 618 had an extrusion rate of 102 feet per minute, while a composition containing 0.05 weight part of the isocyanurate and 0.05 weight part of the oligomeric phenylphosphonite of Example I had an improved extrusion rate of 133 feet per minutes as a result of less water carry-over on the film from the quenching water bath. Film containing the phosphorous compounds of this invention could be produced at a much higher rate than the same film containing commonly used phosphorous additives dues to less water carry-over.

The combination of isocyanurate compound and the oligomeric phenylphosphoni tes provide exceptional heat stability and other processing properties to polyolefin polymers. The combination is especially useful for the stabilization of α-monoolefin homopolymers and copolymers, wherein the α-monoolefin contains 2 to about 8 carbon atoms. High and low-density polyethylene, isotactic and atactic polypropylene, poly-isobutylene, and poly(4-methyl-1-pentene) have excellent resistance to heat and oxygen when stabilized with the combinations of the present invention. Ethylene-propylene copolymers and ethylene-propylene terpolymers, generally containing less than about 10 percent by weight of one or more monomers containing multiple unsaturation provided, for example, by 1,4-hexadiene, dimethyl-1,4,9-decatriene, dicyclopentadiene, vinyl norborene, ethylidene norborene, and the like, also provide excellent ageing properties using the composition of this invention.

Other organic materials which can be stabilized in accordance with the present invention include both natural and synthetic polymers. For example, the stabilizers are useful for the stabilization of cellulosic materials; natural rubber, halogenated rubber, conjugated diene polymers, as, for instance, polybutadiene, copolymers of butadiene with styrene, acrylonitrile, acrylic acid, alkyl acrylates or methacrylates, methyl vinyl ketone, vinyl pyridine, etc.; polyisoprene, polychloroprene, and the like; vinyl polymers such as poly(vinyl chloride), poly(vinylidene chloride), copolymers of vinyl chloride with vinylidene chloride, polyvinyl acetate, copolymers or vinyl halide with butadiene, styrene, vinyl esters, α,β-unsaturated ketones and aldehydes, and the like; homopolymers and copolymers of acrylic monomers such as acrylic acid, methacrylic acid, methyl acrylate, methyl methacrylate, ethyl acrylate, 3-ethylhexyl acrylate, acrylamide, methacrylamide, N-methylol-acrylamide, haloacrylates, acrylonitrile, methacrylonitrile, haloacrylates, and the like; epihalohydrin polymers; polyether- or polyolderived polyurethanes; acetal homopolymers and copolymers; polycarbonates; polyesters such as those derived from maleic, fumaric, itaconic, or terephthalic anhydrides; for example, polyethylene terephthalate; polyamides such as those derived from the reaction of hexamethylenediamine with adipic or sebacic acid; epoxy resins such as those obtained from the condensation of epichlorohydrin with bisphenols; ring opened olefin polymers and the like. Polymer blends, that is, physical admixture of two or more polymers may also be stabilized in accordance with the present invention.

In addition to polymeric materials, the present compounds may stabilize a wide variety of other organic materials. Such compounds include: waxes, synthetic and petroleum-derived lubricating oils and greases; animal oils such as, for example, fat, tallow, lard, cod-liver oil, sperm oil; vegetable oils such as castor, linseed, peanut, palm, cotton seed, and the like; fuel oil; diesel oil, gasoline and the like.

The compounds are readily incorporated into materials to be patented by dissolving or dispersing them with the materials, in liquids, dispersions, solutions, and solid forms. If the material is a solid, especially a polymeric solid such as rubber or a plastic, the compounds can be admixed using mixers such as Banburys, extruders, two-roll mills, and the like, following conventional techniques. One way to disperse the compounds in plastic materials is to dissolve or suspend the compounds in a solvent or diluent, mix the mixture with a plastic in powder or solution form, and then evaporate the solvent.

Compositions containing the novel combination of compounds can also contain other known compounding ingredients such as fillers like carbon black, silica, metal carbonates, talc, and the like; pigments and colorants; curative ingredients like sulfur and peroxides, and vulcanization accelerators; fungicides; processing aids, reinforcing agents and standard ingredients known to the art. Other ingredients known in the art as ultra violet light, thermal and/or oxidative stabilizers can also be used in the stabilized compositions.

We claim:

1. Stabilizer compositions for organic materials subject to degradation comprising (1) oligomeric phenylphosphonites having the formula

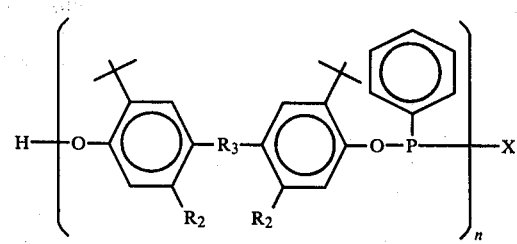

wherein + is a t-butyl radical, $R_3$ is a methylidene, ethylidene, propylidene, isopropylidene, butylidene, or isobutylidene radical, $R_2$ is hydrogen or a methyl radical, X is chlorine or OH and n is about 2 to 10, and (2) hydroxyphenylalkyleneyl isocyanurates of the formula

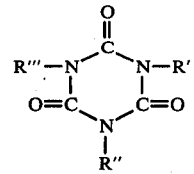

wherein R' is a hydroxyphenylalkyleneyl radical of the formula

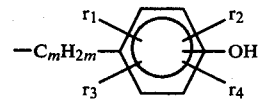

where m is 1 to 4, $r_1$ is an alkyl radical having 1 to 18 carbon atoms and is positioned immediately adjacent to the hydroxy group on the ring; $r_2$, $r_3$, and $r_4$ are hydrogen or an alkyl radical containing 1 to 18 carbon atoms; and R" and R''' are hydrogen, an alkyl radical containing 1 to 18 carbon atoms, or are the same as R'.

2. A composition of claim 1 where in (2) R" and R''' are equal to R', and $r^1$ is a t-alkyl radical containing from 4 to about 12 carbon atoms, $r_2$ is an alkyl radical containing from 1 to about 12 carbon atoms, $r_3$ and $r_4$ are hydrogen, and m is 1.

3. A composition of claim 2 wherein in (1) $R_2$ is methyl radical and n is from 4 to 8, and (2) has the formula

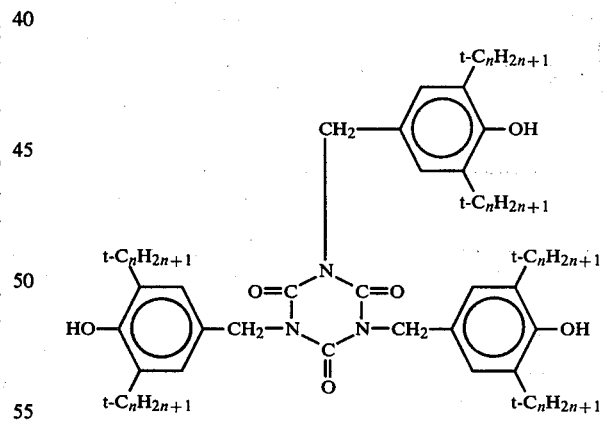

wherein n is 4 to 8.

4. A stabilizer composition of claim 3 wherein (1) $R_3$ is an isopropylidene radical and wherein (2) is 1,3,5-tris(3,5-di-t-butyl-4-hydroxybenzyl) isocyanurate.

5. A stabilizer composition of claim 3 wherein (1) $R_3$ is an butylidene radical and wherein (2) is 1,3,5-tris(3,5-di-t-butyl-4-hydroxybenzyl) isocyanurate.

6. Compositions comprising organic materials subject to degradation and stabilizing amounts of (1) oligomeric phenylphosphonites having the formula

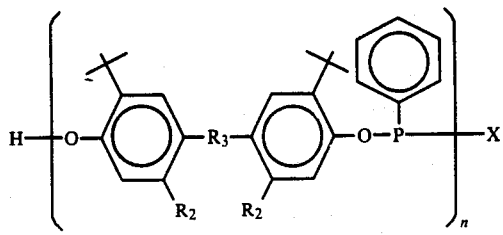

wherein + is a t-butyl radical, R₃ is a methylidene, ethylidene, propylidene, isopropylidene, butylidene, or isobutylidene radical, R₂ is hydrogen or a methyl radical, X is chlorine or OH and n is about 2 to 10, and (2) hydroxyphenylalkyleneyl isocyanurates of the formula

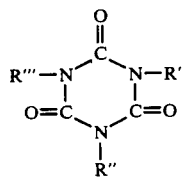

wherein R' is a hydroxyphenylalkyleneyl radical of the formula

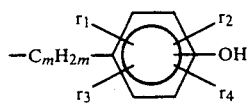

where m is 1 to 4, r₁ is an alkyl radical having 1 to 18 carbon atoms and is positioned immediately adjacent to the hydroxy group on the ring; r₂, r₃, and r₄ are hydrogen or an alkyl radical containing 1 to 18 carbon atoms; and R" and R''' are hydrogen, an alkyl radical containing 1 to 18 carbon atoms, or are the same as R'.

7. A composition of claim 6 wherein said organic material is a polymer and in (2) R" and R''' are equal to R', and r₁ is a t-alkyl radical containing from 4 to about 12 carbon atoms, r₂ is an alkyl radical cal containing from 1 to about 12 carbon atoms, r₃ and r₄ are hydrogen, and m is 1.

8. A composition of claim 7 wherein in (1) R₂ is a methyl radical and n is from 4 to 8, and (2) has the formula

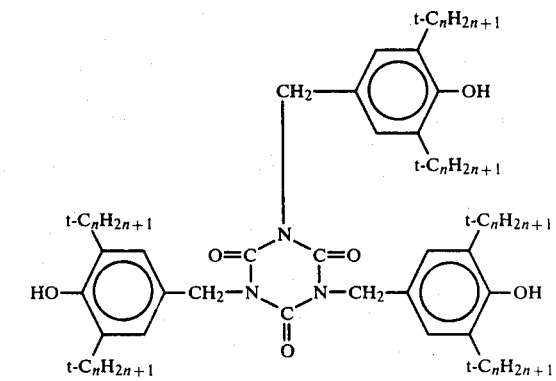

wherein n is 4 to 8.

9. A stabilizer composition of claim 8 wherein in (1) R₃ is an isopropylidene radical, and where in (2) is 1,3,5-tris(3,5-di-t-butyl-4-hydroxybenzyl) isocyanurate.

10. A stabilizer composition of claim 8 wherein in (1) R₃ is an butylidene radical, and where in (2) is 1,3,5-tris(3,5-di-t-butyl-4-hydroxybenzyl) isocyanurate.

11. A composition of claim 9 wherein said polymer is a polyolefin.

12. A composition of claim 10 wherein said polyolefin is polypropylene.

* * * * *